(12) United States Patent
Ayer et al.

(10) Patent No.: US 8,168,306 B2
(45) Date of Patent: May 1, 2012

(54) WELD METAL COMPOSITIONS FOR JOINING STEEL STRUCTURES IN THE OIL AND GAS INDUSTRY

(75) Inventors: Raghavan Ayer, Basking Ridge, NJ (US); Neeraj S. Thirumalai, Phillipsburg, NJ (US); Daniel B. Lillig, Sugar Land, TX (US); Steven J. Ford, Missouri City, TX (US); Douglas P. Fairchild, Sugar Land, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 176 days.

(21) Appl. No.: 11/901,488

(22) Filed: Sep. 18, 2007

(65) Prior Publication Data
US 2009/0075118 A1 Mar. 19, 2009

(51) Int. Cl.
*B23K 9/02* (2006.01)
(52) U.S. Cl. ...................... 428/546; 219/60 R
(58) Field of Classification Search ............... 228/112.1, 228/2.1
See application file for complete search history.

(56) References Cited

U.S. PATENT DOCUMENTS

| | | | |
|---|---|---|---|
| 3,995,139 A | 11/1976 | Bouvard | |
| 4,156,123 A | 5/1979 | Fischer et al. | |
| 4,188,156 A * | 2/1980 | Fisher et al. | 405/224.3 |
| 4,211,503 A | 7/1980 | Peterson et al. | |
| 4,255,497 A * | 3/1981 | Bond et al. | 428/685 |
| 4,545,826 A | 10/1985 | McCann et al. | |
| 4,639,576 A * | 1/1987 | Shoemaker et al. | 219/146.23 |
| 4,790,473 A | 12/1988 | Narasimhana et al. | |
| 5,794,835 A * | 8/1998 | Colligan et al. | 228/2.1 |
| 6,113,849 A | 9/2000 | Bruyere et al. | |
| 6,193,145 B1 * | 2/2001 | Fournier et al. | 228/262.41 |
| 6,648,991 B2 * | 11/2003 | Turconi et al. | 148/320 |
| 6,837,311 B1 * | 1/2005 | Sele et al. | 166/353 |
| 2002/0142183 A1 * | 10/2002 | Colligan | 428/593 |
| 2003/0234278 A1 * | 12/2003 | Tominaga et al. | 228/193 |
| 2004/0238599 A1 * | 12/2004 | Subramanian et al. | 228/112.1 |
| 2005/0252901 A1 * | 11/2005 | Erichsen et al. | 219/137 WM |
| 2006/0201915 A1 | 9/2006 | Obana et al. | |

FOREIGN PATENT DOCUMENTS

| | | |
|---|---|---|
| JP | 63212091 A | 9/1988 |
| JP | 2001294992 A | 10/2001 |
| WO | WO 2006/115754 A2 | 11/2006 |

OTHER PUBLICATIONS

Inconel 625 data sheet from www.specialmetals.com. Copyright 2006.*

* cited by examiner

*Primary Examiner* — David Sample
*Assistant Examiner* — Megha Mehta
(74) *Attorney, Agent, or Firm* — Robert A. Migliorini

(57) ABSTRACT

Provided are metal structures and methods of forming such structures for use in oil, gas and/or petrochemical applications that are joined with non-ferrous weld metal compositions or a high alloy weld metal compositions. The welded metal structures include two or more segments of ferrous or non-ferrous components, and fusion welds, friction stir welds or a combination thereof bonding adjacent segments of the components together, wherein the welds comprise a non-ferrous weld metal composition or a high alloy weld metal composition that is substantially different from the metal composition of the two or more components. The resultant welded structures exhibit improvements in fatigue resistance, toughness, strain capacity, strength, stress corrosion cracking resistance, and hydrogen embrittlement resistance compared to traditional iron-based weld compositions. The structures and methods of forming such structures are advantageous in joining metal components in applications for natural gas transportation and storage, oil and gas well completion and production, and oil and gas refinery and chemical plants.

48 Claims, No Drawings

WELD METAL COMPOSITIONS FOR JOINING STEEL STRUCTURES IN THE OIL AND GAS INDUSTRY

FIELD

The present disclosure relates generally to the field of welding of steel structures and components. More specifically, the present disclosure relates to welding of steel structures and components in the oil and gas industry with non-ferrous weld metals to achieve high performance joints.

BACKGROUND OF THE INVENTION

For convenience, various welding terms used in this specification are defined in the Glossary of Terms below.

GLOSSARY OF TERMS

CRA: Corrosion resistant alloys. A specially formulated material used for completion components likely to present corrosion problems. Corrosion-resistant alloys may be formulated for a wide range of aggressive conditions.

HAZ: Heat-affected-zone.

Heat-affected-zone: Base metal that is adjacent to the weld line and that was affected by the heat of welding.

Toughness: Resistance to fracture initiation.

Fatigue: Resistance to fracture under cyclic loading.

Fretting fatigue: Fretting involves contact between surfaces undergoing small cyclic relative tangential motion. Fretting fatigue resistance is resistance to fracture in a notched metal parts or metal parts with holes.

Yield Strength: Ability to bear load without deformation.

FS: Friction stir.

FSW: Friction stir welding.

Friction Stir Welding: A solid state joining process for creating a welded joint between two work pieces in which the heat for joining the metal work pieces is generated by plunging a rotating pin of a tool between the work pieces.

FSP: Friction stir processing.

Friction stir processing: The method of processing and conditioning the surface of a structure by pressing a FSW tool against the surface by partially plunging a pin into the structure.

Weld joint: A welded joint including the fused or thermo-mechanically altered metal and the base metal in the "near vicinity" of, but beyond the fused metal. The portion of the base metal that is considered within the "near vicinity" of the fused metal varies depending on factors known to those in the welding art.

Weldment: An assembly of component parts joined by welding.

Weldability: The feasibility of welding a particular metal or alloy. A number of factors affect weldability including chemistry, surface finish, heat-treating tendencies and the like.

Carbon equivalent: A parameter used to define weldability of steels and expressed by the formula $CE=C+Mn/6+(Cr+Mo+V)/5+(Ni+Cu)/15$ where all units are in weight percent.

Hydrogen cracking: Cracking that occurs in the weld subsequent to welding.

TMAZ: Thermo-mechanically affected zone.

Thermo-mechanically affected zone: Region of the joint that has experienced both temperature cycling and plastic deformation.

TMAZ-HZ: The hardest region in a weldment.

LNG: Liquefied natural gas. Gas, mainly methane, liquefied under atmospheric pressure and low temperature.

CNG: Compressed natural gas. Natural gas in high-pressure surface containers that is highly compressed (though not to the point of liquefaction).

PLNG: Pressurized liquefied natural gas. Gas, mainly methane, liquefied under moderate pressure and low temperature (higher temperature than LNG).

SCR: Steel catenary riser. A deepwater steel riser suspended in a single catenary from a platform and connected horizontally on the seabed.

TTR: Top tension riser. A riser on offshore oil rigs which is placed in tension to maintain even pressure on marine riser pipe.

Invar: An alloy of iron and nickel specifically designed to have low coefficient of thermal expansion Duplex: Steel consisting of two phases, specifically austenite and ferrite Trees: The assembly of valves, pipes, and fittings used to control the flow of oil and gas from a well.

BOP: Blow Out Preventer. The equipment installed at the wellhead to control pressures in the annular space between the casing and drill pipe or tubing during drilling, completion, and work over operations.

OCTG: Oil Country Tubular Goods. A term applied to casing, tubing, plain-end casing liners, pup joints, couplings, connectors and plain-end drill pipe.

Semi-submersibles: Mobile drilling platform with floats or pontoons submerged to give stability while operating. Used in deeper waters down to 360 meters or more. Kept in position by anchors or dynamic positioning.

Jack-up rigs: Mobile drilling platform with retractable legs used in shallow waters less than 100 meters deep.

TLP: Tension Leg Platform. A floating offshore structure held in position by a number of tension-maintaining cables anchored to seabed. Cables dampen wave action to keep platform stationary.

DDCV: Deep Draft Caisson Vessel. Deep draft surface piercing cylinder type of floater, particularly well adapted to deepwater, which accommodates drilling, top tensioned risers and dry completions.

Compliant towers: Narrow, flexible towers and a piled foundation supporting a conventional deck for drilling and production operations. Designed to sustain significant lateral deflections and forces, and are typically used in water depths ranging from 1,500 to 3,000 feet (450 to 900 m).

FPSO: Floating Production Storage and Offloading vessel. A converted or custom-built ship-shaped floater, employed to process oil and gas and for temporary storage of the oil prior to transshipment.

FSO: Floating Storage and Offloading vessel. A floating storage device, usually for oil, commonly used where it is not possible or efficient to lay a pipe-line to the shore. The production platform will transfer the oil to the FSO where it will be stored until a tanker arrives and connects to the FSO to offload it Tendons: Tubular tethers that permanently moor a floating platform attached at each of the structure's corners.

Umbilicals: An assembly of hydraulic hoses which can also include electrical cables or optic fibers, used to control a subsea structure or ROV from a platform or a vessel.

Tender vessels: A support/supply ship for carrying passengers and supplies to and from facilities close to shore.

Long-Felt Need

Most steel structures are welded with steel (also referred to as ferrous-based, or iron-based) weld metals. These steel welds are generally iron with about 0.1 wt % carbon and up to 2 to 3 wt % of other alloying elements, such as Mn, Ni, Cu and combinations thereof. The toughness and residual stresses that are developed in these ferrous welds/weldments are the result of complex interactions of the properties of the base steel, the type of weld metal, and the thermal cycles associated with the welding process. The performance of most welded structures (e.g. load bearing ability, fatigue, environmental cracking) is controlled by the properties of the weldments, which consist of the weld and the heat affected zone (HAZ). Although the properties of the weld can be controlled by the design of the weld metal chemistry, the joint performance is dictated by a complex interaction between base/weld metal chemistries and the weld procedure. Historically, most steel structures are joined by fusion welding using iron-based weld metals. The primary reasons for the use of iron-base welds have been their low cost, the ability to match the strength of the base metal through alloying, and extensive use in the industry.

Although deficiencies in weldment integrity for many land-based structural applications can be accommodated through enhanced redundancy, such an approach is not practical for offshore and deepwater structures where component weight is critical. In these structures, it is necessary to enhance the weldment integrity so that they are not limiting the integrity of the structure. The joining of metal parts such as pipes and tubes to form pipelines for oil, gas and geothermal wells and the like is largely performed by conventional arc or fusion welding of steel structures or components with these conventional iron-based weld metals. Arc or fusion welding typically involves the melting of a steel weld metal to create the joint joining of two ferrous components or parts.

Such ferrous-based metal joints typically have acceptable properties, however improvements in strength, toughness and integrity of the weldment would further improve weldment performance, and correspondingly structure/component performance. For example, in welding steel pipes for offshore pipelines with ferrous-based weldments, there is the problem of bending stresses that results from the completed pipe hanging off the stem of the laybarge. In addition, conventional ferrous-based fusion welded joints suffer from other attributes which degrade the mechanical integrity of the joints. Examples of such attributes are tensile residual stress, hydrogen cracking, lack of fusion defects and low toughness. Hence, there is a need for a new weld metal compositions for rapidly joining steels in order to achieve joints with superior performance.

SUMMARY

Broadly stated, the present disclosure provides the use of weld metals that are predominantly made of elements other than iron (i.e. non-ferrous) or high iron content alloys in which the strengthening comes from sources other than carbon to improve weldment properties and performance in joining steel components and structures in the oil, gas and petrochemical industry.

In one form of the present disclosure is provided an advantageous oil, gas and/or petrochemical ferrous or non-ferrous material structure comprising: two or more segments of ferrous or non-ferrous components, and fusion welds, friction stir welds or a combination thereof bonding adjacent segments of the components together, wherein the welds comprise a non-ferrous weld metal composition or a high alloy weld metal composition that is substantially different from the metal composition of the two or more components.

In another form of the present disclosure is provided an advantageous method of joining ferrous or non-ferrous material structures for oil, gas and/or petrochemical applications comprising: providing two or more segments of ferrous or non-ferrous components, and fusion welding, friction stir welding or a combination thereof adjacent segments of the components together, wherein the welds comprise a non-ferrous weld metal composition or a high alloy weld metal composition that is substantially different from the metal composition of the two or more components.

In still another form of the present disclosure is provided an advantageous method for welding two or more ferrous or non-ferrous components to produce a weld having a specific property or set of properties chosen for an intended application, the method comprising: obtaining a data base of weld properties for welds formed by fusion welding, friction stir welding or a combination thereof under a plurality of conditions and from various weld metal compositions; correlating the weld conditions and weld metal compositions to the weld properties; selecting the weld conditions from the data base that will produce a weld having the property or set of properties best suited to the intended application; subjecting the components to fusion welding, friction stir welding or a combination thereof under the conditions selected to form a welded structure, wherein the weld comprises a non-ferrous weld metal composition or a high alloy weld metal composition that is substantially different from the metal composition of the two or more components.

These and other forms of the novel non-ferrous or high iron content alloys in which the strengthening comes from sources other than carbon weld metals, methods of welding with such metals, and applications of such metals in oil and gas applications disclosed herein will become apparent upon a reading of the detailed description which follows.

DETAILED DESCRIPTION

Although weldment properties may be influenced by the weld procedure, it has been discovered that a comparable or greater effect can be achieved if the weld metal has a composition and properties that are substantially different from those of the base steel components to be welded. Specifically, the thermal expansion coefficient of the weld metal and the ability to control the phase transformation temperature (in some systems) provide the ability to better control the weld metal properties. In addition, the crystal structure of the weld metal (e.g. cubic vs. hexagonal) and its effect on the mechanical flow can have a significant effect on weldment properties. It has been discovered that the weld metal chemistry can be tailored to achieve specific properties for enhanced weldment integrity when bonding base metal components that are substantially different in material composition from the weld metal composition. Substantially different for the purposes of present disclosure means that the weld metal composition and the structural component composition for welding are composed of different materials. That is the type of the majority element and/or primary alloying element of the weld metal is not the same as the corresponding type of the majority element and/or primary alloying element of the structural component.

The improved weld metals disclosed herein include any of the non-ferrous base chemistries (e.g. Ni, V, Ti, Co, Cr, Mn, Zr, Hf based alloys) with suitable alloying, or combination of these alloys, to achieve the required weld metal properties. The alloying elements that are added to these nonferrous systems depend on the system, however, some non-limiting exemplary additions, include not only those listed above (Ni, V, Ti, Co, Cr, Mn, Zr, Hf) but also, aluminum, tin, molybdenum, silicon, niobium, and combinations thereof.

For the non-ferrous alloys for use as welds disclosed herein, greater than 50 wt %, or greater than 60 wt %, or greater than 70 wt %, or greater than 80 wt %, or greater than 90 wt % of the alloy, or greater than 95 wt % of the alloy is chosen from one or more of the following elements: Ni, Mn, V, Ti, Co, Zr, and Hf. In addition, these non-ferrous alloys for use as welds disclosed herein, may also optionally include iron at less than 50 wt %, or less than 40 wt %, or less than 30 wt %, or less than 20 wt %, or less than 10 wt %, or less than 5 wt %. The strength in these non-ferrous alloys for use as welds may arise from phase transformation, either in the form of precipitation or in the form of a transformation of the majority phase (defined as constituting greater than 50 wt % of the weld). The non-ferrous alloys for use as welds may be either commercial alloys based on Ni, Mn, V, Ti, Co, Cr, Zr, or Hf or a combination of two or more non-ferrous elements.

In one exemplary form, an advantageous commercial nickel alloy may comprise Inconel 625, which is a nickel base alloy having the following chemistry: Ni-21% Cr-5% Fe-10% Mo-4% Nb. In another exemplary form, an advantageous commercial titanium alloy may comprise Ti64, which is a titanium based alloy having the following chemistry: Ti-6% Al-4% V. Alternatively, the welds may be made up of other combinations of these elements at levels different than that found in commercial alloys (e.g. a blend of a nickel and titanium alloy). In general, any combination of nonferrous elements that can be made into a weld metal would be a candidate for these applications.

In an alternative form of the weld metals disclosed herein, the high alloy welds may include iron as the dominant element, and also include other elements in higher concentration than found in typical steels. Examples are stainless steels (Fe-18% Cr-10% Ni), precipitation hardening (PH) steels (Fe-16% Cr-6% Ni-1% Al) and other Fe-base alloys including maraging steels. As distinguished from non-ferrous alloys previously disclosed, such inventive weld metals shall be referred to herein as 'high alloy weld metals or ferrous alloys with non-carbon strengthening elements." These high alloy weld metals or ferrous alloys with non-carbon strengthening elements are strengthened by elements other than carbon, and therefore carbon may be present at less than 0.05 wt %, or less than 0.025 wt %, or less than 0.01 wt %. Alternatively, carbon may be altogether absent from such high alloy weld metals, except possibly at trace impurity levels.

The current disclosure also relates to the use of such non-ferrous weld metals and high alloy weld metals to join steel structures (replacing conventionally used steels weld metals) to achieve high performance joints. The weld metal plays a key role in the properties of the weldments. Replacement of conventional steel weld metals with non-ferrous metals herein (e.g. nickel, titanium, cobalt alloys) or high alloy weld metals disclosed having different physical and mechanical properties compared to steel enhances the weldment integrity in several ways. First, the non-ferrous weld metals or high alloy weld metals disclosed herein may enhance the strength and toughness of the welds as a result of their inherent microstructures. Second, the non-ferrous weld metals or high alloy weld metals disclosed herein may enhance the integrity of the weldment through their effect on the residual stress as a result of their effect on the physical properties such as strain hardening coefficient, coefficient of thermal expansion, latent heat of fusion, higher phase transformation temperature and different high temperature flow stress. The difference in these properties compared to steel component/structure being welded provides opportunities to enhance weldment properties, such as fatigue, HAZ and weld metal strength and toughness.

In one aspect, the non-ferrous weld metal or high alloy weld metal compositions disclosed herein are useful in welding cast irons and carbon steel components. In another aspect, the non-ferrous weld metal or high alloy weld metal compositions disclosed herein are particularly useful in welding high carbon steels, especially those having a CE equal to or greater than 0.48. Exemplary, but not limiting, plain carbon and alloy steels include, AISI 1010, 1020, 1040, 1080, 1095, A36, A516, A440, A633, A656, 4063, 4340, and 6150. Exemplary, but not limiting, high carbon steels include, AISI WI, SI, O1, A2, D2, M1, and API L80. In another aspect of the present disclosure, the non-ferrous weld metal or high alloy weld metal compositions disclosed herein are useful in welding ferrous corrosion resistant alloys, including but not limited to, stainless steel. Exemplary, but not limiting, stainless steels include, AISI 409, 446, 304, 316L, 410, 440A, 17-7PH and duplex stainless steel. In a further aspect of the present disclosure, the non-ferrous weld metal or high alloy weld metal compositions disclosed herein are useful in treating/welding non-ferrous alloys, including, but not limited to, titanium alloys, cobalt alloys, iron-nickel alloy, and nickel alloys.

The non-ferrous weld metal or high alloy weld metal compositions disclosed herein may be welded using all conventional fusion welding methods, including, but not limited to: SMAW (Shielded Metal Arc Welding), SAW (Submerged Arc Welding), GMAW (GasMetal SRc Welding), FCAW (Flux Cored Arc Welding), PAW (Plasma Arc Welding), ESW (Electroslag Welding), EGW (Electrogas Welding), RW (Resistance Welding), and OFW (Oxyfuel Gas Welding). In addition, the non-ferrous weld metal or high alloy weld metal compositions may be welded by solid state methods, such as friction stir welding (FSW) or a combination of fusion welding methods and solid state welding methods (FSW). The benefits of FSW are primarily derived from the following characteristics: (1) lower temperatures required to perform the joining and lower temperatures in the joint cause less detrimental effects in the adjoining base metal (e.g., coarse grains); (2) high degree of plastic deformation resulting from the rotation of the tool which results in fine grain size which is conducive to improved strength and toughness; and (3) avoidance of hydrogen embrittlement in weldments as compared to fusion welds, which are often prone to hydrogen embrittlement from the decomposition of the residual moisture in the arc. The use of FSW welding in oil, gas and petrochemicals applications is disclosed in U.S. patent application Ser. No. 11/643,528, herein incorporated by reference in its entirety.

The advantageous properties provided by using the non-ferrous weld metal or high alloy weld metal compositions disclosed herein, include one or more of the following non-limiting properties, increased fatigue resistance, increased toughness, increased strain capacity, increased strength, increased stress corrosion cracking resistance, and higher hydrogen embrittlement resistance.

Applications

The non-ferrous weld metal or high alloy weld metal compositions disclosed herein may be used in the welding of duplex stainless steels (duplex s.s. or DSS). Duplex s.s. derives its strength and corrosion resistance from a controlled balance of ferrite and austenite phases. The desired mixture of phases in the bulk duplex s.s. is achieved by controlled hot working and/or a combination of cold working and annealing treatments. However, when duplex s.s. is welded, the steel is heated to a very high temperature in a single phase ferrite region and cools to the duplex phase upon cooling to room temperature. In order to achieve the required balance of phases in the weldment at room temperature, the cooling rate of the weld has to be controlled. In practice, the cooling rate varies considerably affecting the phase balance and thus the resultant properties of the weldment. The welding of duplex s.s. using the non-ferrous weld metal or high alloy weld metal compositions disclosed herein may provide improved joint properties. In the case of non-ferrous welds, the welds consist predominantly of a single phase (e.g. cubic or hexagonal), and, therefore, weld property degradation through improper cooling would be minimized. The welds essentially have a single phase and, therefore, would be insensitive to cooling rates.

The non-ferrous weld metal or high alloy weld metal compositions disclosed herein may be used to form welds, for example as spot welds and butt welds, as well as to repair weld areas. More particularly, weld compositions disclosed herein may be used to join and repair/treat respectively steel structures and structural components associated with the oil, gas and petrochemical industry. The weld compositions disclosed herein may be utilized either in a manufacturing facility such as a steel mill where the components are made or in the field of fabrication yard where the components are assembled. The fusion welding, FSW and combination thereof using the non-ferrous weld metal or high alloy weld metal compositions disclosed herein are also suitable for forming and repairing/treating structures in oil and gas exploration, production and refining applications. FSW is particularly advantageous for forming spot welds and butt welds of tubular components in these types of applications.

Exemplary, but non-limiting, structures in the oil and gas exploration, production, refining industry where the novel non-ferrous weld metal or high alloy weld metal compositions disclosed herein are suitable include high strength pipeline weld areas, SCR and TTR weld areas, threaded components, oil drilling equipment weld areas (i.e. two sections of a deep water oil drill string), Liquified Natural Gas (LNG) and Pressurized Liquified Natural Gas (PLNG) or Compressed Natural Gas (CNG) container weld areas, riser/casing joints, and well head equipment.

In oil and gas upstream applications, the novel non-ferrous weld metal or high alloy weld metal compositions disclosed herein are also suitable for joining and repairing structures and components used in natural gas transportation and storage type applications. In particular, the weld metals disclosed herein may be utilized to enable gas transportation technologies ranging from pipelines, compressed natural gas (CNG), pressurized liquefied natural gas (PLNG), liquefied natural gas (LNG) and other storage/transportation technologies. In one form in natural gas transportation and storage type applications, the weld compositions disclosed herein may be used for the joining/processing of pipelines, flow lines, gathering lines, expansion loops, and other transmission lines. In another form in natural gas transportation and storage type applications, the weld compositions disclosed herein may be used for joining/processing of materials made of carbon steels, cast irons, structural steels, or corrosion resistant alloys comprising steels, cast irons, stainless steels, duplex stainless steels, nickel or cobalt based alloys, other Fe—Ni alloys (e.g. Invar) or joining of other dissimilar metals (e.g. steel and nickel). In yet another form in natural gas transportation and storage type applications, the weld compositions disclosed herein may be used for the joining/processing of LNG, CNG, and PLNG storage and/or transportation structures. This includes modular LNG structures, shipping vessels, transferring components and pipelines, and related technologies (e.g. 9% Ni tanks, Invar tanks).

In oil and gas exploration and production applications, the non-ferrous weld metal or high alloy weld metal compositions disclosed herein also may be utilized for joining and repairing various structures used for oil and gas well completion and production. These structures include, but are not limited to, offshore and onshore production structures, oil pipelines, oil storage tanks, casing/tubing, completion and production components, cast structure to flow line connections, subsea components, downhole tubular products (e.g. OCTG), topsides and related structures, umbilicals, tender and supply vessels, and flare towers. More particularly, exemplary offshore production structures include jacketed platforms, mobile offshore drilling units and related production components like casings, tendons, risers, and subsea facilities. Mobile offshore drilling units include, but are not limited to, semi-submersibles and jack-up rigs, TLPs, DDCVs, compliant towers, FPSO, FSO, ships, tankers and the like. Exemplary subsea components include, but are not limited to, duplex, manifold systems, trees, and BOPs. Exemplary topsides and related structures include deck superstructures, drilling rigs, living quarters, helidecks, and related structures. It should be understood that FSW may be used to form the welds comprising such structures and components and FSP may be used to repair and treat the welds or joints comprising such structures.

In downstream applications, the non-ferrous weld metal or high alloy weld metal compositions disclosed herein are suitable for joining and repairing structures and components used in refining and chemical plants. The weld compositions disclosed herein provide advantages in the refining and chemicals plant applications through, inter alia, repair of components/structures, dissimilar metal joining, joining of steel structures and joining of difficult to weld materials, such as cast iron. These applications include, but are not limited to, cast iron, heat exchanger tubes and low and high-temperature process and pressure vessels. Exemplary low and high-temperature process and pressure vessels include steam cracker tubes, steam reforming tubes, and refinery structures and components.

In the practice of the present disclosure, whether performing fusion FSW or FSP with the novel weld compositions disclosed herein, the process is conducted under conditions sufficient to provide a weld joint or crack repair having a preselected property or set of properties based on the intended use of the weldment. For example, if the use of the weldment requires toughness over fatigue, the conditions are chosen to favor a weld having those properties.

In one form of the welding methods utilizing the non-ferrous weld metal or high alloy weld metal compositions disclosed herein, a data base of weld properties, including but not limited to toughness, strengths, hardness, fatigue, grain size and the like, for various base metals is obtained and correlated to the welding conditions under which the weld or repair was performed. Then when a property or set of properties is chosen for weld joint for an intended application, the weld compositions and welding or repair conditions employed are selected from those conditions that produce the chosen property or properties.

As will be readily appreciated, the work pieces described in the above embodiments need not be formed of the same base metal. Similarly, the weld metal composition is generally not formed of the same metal as the work pieces. Thus the work pieces are formed generally of a ferrous material and the weld metal comprising the weld compositions disclosed herein of a different material (non-ferrous weld metal or high alloy weld metal compositions disclosed herein). Hence, the weld composition and the two work pieces for welding are generally made of different materials.

Applicants have attempted to disclose all forms and applications of the disclosed subject matter that could be reasonably foreseen. However, there may be unforeseeable, insubstantial modifications that remain as equivalents. While the present disclosure has been described in conjunction with specific, exemplary forms thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. All numerical values within the detailed description and the claims herein are also understood as modified by "about."

What is claimed is:

1. A ferrous or non-ferrous material structure for use in the oil, gas and/or petrochemical industry comprising:
    two or more segments of either ferrous components, or non-ferrous components, wherein the two or more segments are of the same base metal and
    fusion welds bonding adjacent segments of the components together, wherein the fusion welds necessarily include a filler material,
    wherein the welds comprise a non-ferrous weld metal composition that is substantially different from the metal composition of the two or more segments,
    wherein the non-ferrous weld metal composition is Ti64 or a composition including a combination of both nickel and cobalt, wherein the combination of both nickel and cobalt is at greater than 50 wt. % of the composition, and
    wherein the ferrous or non-ferrous components are chosen from a plain carbon steel, a cast iron, a high carbon steel having a CE equal to or greater than 0.48, a cobalt based alloy, a nickel based alloy, and a titanium based alloy with the proviso that when the components are a titanium based alloy, the non-ferrous weld metal composition is not Ti64, and when the components are a nickel based alloy, the non-ferrous weld metal composition is not a combination of both nickel and cobalt.

2. The structure of claim 1, wherein the non-ferrous weld metal composition includes less than 50 wt % iron.

3. The structure of claim 2, wherein the non-ferrous weld metal composition includes less than 5 wt % iron.

4. The structure of claim 1, wherein the method of forming the fusion welds is chosen from shielded metal arc welding, submerged arc welding, gas metal arc welding, flux cored arc welding, plasma arc welding, electroslag welding, electrogas welding, resistance welding, and oxyfuel gas welding.

5. The structure of claim 1, wherein the weldment formed from the two or more components and welds exhibits one or more of increased fatigue resistance, increased toughness, increased strain capacity, increased strength, increased stress corrosion cracking resistance, and higher hydrogen embrittlement resistance.

6. The structure of claim 1 chosen from high strength pipelines, steel catenary risers, top tension risers, threaded components, liquefied natural gas containers, pressurized liquefied natural gas containers, deep water oil drill strings, riser/casing joints, and well-head equipment.

7. The structure of claim 1, wherein the structure is used in natural gas transportation and storage type structures and components.

8. The structure of claim 7, wherein the natural gas transportation and storage type structures and components are chosen from pipelines, flow lines, gathering lines, transmission lines, shipping vessels, transferring components, storage tanks, and expansion loops.

9. The structure of claim 8, wherein the natural gas is in the form of liquefied natural gas, compressed natural gas or pressurized liquefied natural gas.

10. The structure of claim 1, wherein the component is used in oil and gas well completion and production structures and components.

11. The structure of claim 10, wherein the oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

12. The structure of claim 11, wherein the off-shore production structures/components are chosen from jacketed platforms, mobile offshore drilling units, casings, tendons, risers, subsea facilities, semi-submersibles, jack-up rigs, tension leg platforms, deep draft caisson vessels, compliant towers, floating production storage and offloading vessels, floating storage and offloading vessels, ships, and tankers.

13. The structure of claim 12, wherein the subsea components are chosen from duplexes, manifold systems, trees and blow out preventers.

14. The structure of claim 1, wherein the structure is used in oil and gas refinery and chemical plant structures and components.

15. The structure of claim 14, wherein the oil and gas refinery and chemical plant structures and components are chosen from cast iron components, heat exchanger tubes, and low and high temperature process and pressure vessels.

16. The structure of claim 15, wherein said low and high temperature process and pressure vessels are chosen from steam cracker tubes, and steam reforming tubes.

17. A ferrous or non-ferrous material structure for use in the oil, gas and/or petrochemical industry comprising:
    two or more segments of either ferrous components, or non-ferrous components, wherein the two or more segments are of the same base metal and
    fusion welds bonding adjacent segments of the components together, wherein the fusion welds necessarily include a filler material,
    wherein the welds comprise a non-ferrous weld metal composition that is substantially different from the metal composition of the two or more segments,
    wherein the non-ferrous weld metal composition is Ti64, and
    wherein the ferrous or non-ferrous components are chosen from a plain carbon steel, a cast iron, a high carbon steel having a CE equal to or greater than 0.48, an alloy steel, a cobalt based alloy, a iron-nickel alloy, an iron based alloy, and a nickel based alloy.

18. The structure of claim 17, wherein the method of forming the fusion welds is chosen from shielded metal arc welding, submerged arc welding, gas metal arc welding, flux cored arc welding, plasma arc welding, electroslag welding, electrogas welding, resistance welding, and oxyfuel gas welding.

19. The structure of claim 17, wherein the weldment formed from the two or more components and welds exhibits one or more of increased fatigue resistance, increased toughness, increased strain capacity, increased strength, increased stress corrosion cracking resistance, and higher hydrogen embrittlement resistance.

20. The structure of claim 17 chosen from high strength pipelines, steel catenary risers, top tension risers, threaded components, liquefied natural gas containers, pressurized liquefied natural gas containers, deep water oil drill strings, riser/casing joints, and well-head equipment.

21. The structure of claim 17, wherein the structure is used in natural gas transportation and storage type structures and components.

22. The structure of claim 21, wherein the natural gas transportation and storage type structures and components are chosen from pipelines, flow lines, gathering lines, transmission lines, shipping vessels, transferring components, storage tanks, and expansion loops.

23. The structure of claim 22, wherein the natural gas is in the form of liquefied natural gas, compressed natural gas or pressurized liquefied natural gas.

24. The structure of claim 17, wherein the component is used in oil and gas well completion and production structures and components.

25. The structure of claim 24, wherein the oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

26. The structure of claim 25, wherein the off-shore production structures/components are chosen from jacketed platforms, mobile offshore drilling units, casings, tendons, risers, subsea facilities, semi-submersibles, jack-up rigs, tension leg platforms, deep draft caisson vessels, compliant towers, floating production storage and offloading vessels, floating storage and offloading vessels, ships, and tankers.

27. The structure of claim 26, wherein the subsea components are chosen from duplexes, manifold systems, trees and blow out preventers.

28. The structure of claim 17, wherein the structure is used in oil and gas refinery and chemical plant structures and components.

29. The structure of claim 28, wherein the oil and gas refinery and chemical plant structures and components are chosen from cast iron components, heat exchanger tubes, and low and high temperature process and pressure vessels.

30. The structure of claim 29, wherein said low and high temperature process and pressure vessels are chosen from steam cracker tubes, and steam reforming tubes.

31. A method of joining ferrous or non-ferrous material structures for use in the oil, gas and/or petrochemical industry comprising:
providing two or more segments of either ferrous components, or non-ferrous components, wherein the two or more segments are of the same base metal and
fusion welding adjacent segments of the components together with a filler material,
wherein the welds comprise a non-ferrous weld metal composition that is substantially different from the metal composition of the two or more segments,
wherein the non-ferrous weld metal composition is chosen from Ti64 or a composition including a combination of both nickel and cobalt, wherein the combination of both nickel and cobalt is at greater than 50 wt. % of the composition, and
wherein the ferrous or non-ferrous components are chosen from a plain carbon steel, a cast iron, a high carbon steel having a CE equal to or greater than 0.48, a cobalt based alloy, a nickel based alloy, and a titanium based alloy with the proviso that when the components are a titanium based alloy, the non-ferrous weld metal composition is not Ti64, and when the components are a nickel based alloy, the non-ferrous weld metal composition is not a combination of both nickel and cobalt.

32. The method of claim 31, wherein the non-ferrous weld metal composition includes less than 50 wt % iron.

33. The structure of claim 31, wherein the non-ferrous weld metal composition comprises Ti64.

34. The method of claim 31, wherein the method of forming the fusion welds is chosen from shielded metal arc welding, submerged arc welding, gas metal arc welding, flux cored arc welding, plasma arc welding, electroslag welding, electrogas welding, resistance welding, and oxyfuel gas welding.

35. The method of claim 31, wherein the weldment formed from the two or more components and welds exhibits one or more of increased fatigue resistance, increased toughness, increased strain capacity, increased strength, increased stress corrosion cracking resistance, and higher hydrogen embrittlement resistance.

36. The method of claim 31 chosen from high strength pipelines, steel catenary risers, top tension risers, threaded components, liquefied natural gas containers, pressurized liquefied natural gas containers, deep water oil drill strings, riser/casing joints, and well-head equipment.

37. The method of claim 31, wherein the structure is used in natural gas transportation and storage type structures and components.

38. The method of claim 37, wherein the natural gas transportation and storage type structures and components are chosen from pipelines, flow lines, gathering lines, transmission lines, shipping vessels, transferring components, storage tanks, and expansion loops.

39. The method of claim 38, wherein the natural gas is in the form of liquefied natural gas, compressed natural gas or pressurized liquefied natural gas.

40. The method of claim 38, wherein the component is used in oil and gas well completion and production structures and components.

41. The method of claim 40, wherein the oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

42. The method of claim 41, wherein the off-shore production structures/components are chosen from jacketed platforms, mobile offshore drilling units, casings, tendons, risers, subsea facilities, semi-submersibles, jack-up rigs, tension leg platforms, deep draft caisson vessels, compliant towers, floating production storage and offloading vessels, floating storage and offloading vessels, ships, and tankers.

43. The method of claim 42, wherein the subsea components are chosen from duplexes, manifold systems, trees and blow out preventers.

44. The method of claim 31, wherein the structure is used in oil and gas refinery and chemical plant structures and components.

45. The method of claim 44, wherein the oil and gas refinery and chemical plant structures and components are chosen from cast iron components, heat exchanger tubes, and low and high temperature process and pressure vessels.

46. The method of claim 45, wherein said low and high temperature process and pressure vessels are chosen from steam cracker tubes, and steam reforming tubes.

47. A method for welding two or more ferrous components, or non-ferrous components for use in the oil, gas and/or petrochemical industry structures comprising:

providing two or more segments of either ferrous components, or non-ferrous components, wherein the two or more segments are of the same base metal and fusion welding adjacent segments of the components together with a filler material, wherein the weld comprises a non-ferrous weld metal composition that is substantially different from the metal composition of the two or more components, and wherein the non-ferrous weld metal composition is Ti64, wherein the ferrous components, or non-ferrous components are chosen from a plain carbon steel, a cast iron, a high carbon steel having a CE equal to or greater than 0.48, an alloy steel, a cobalt based alloy, a iron-nickel alloy, an iron based alloy, and a nickel based alloy.

48. The method of claim 47 wherein the structures are chosen from high strength pipelines, steel catenary risers, top tension risers, threaded components, liquefied natural gas containers, pressurized liquefied natural gas containers, deep water oil drill strings, riser/casing joints, and well-head equipment.

* * * * *